Dec. 18, 1962    G. H. SERVOS    3,069,620
DIELECTRIC TESTING DEVICE
Filed Sept. 29, 1959

INVENTOR.
G.H. SERVOS

ATTORNEY 3,069,620
DIELECTRIC TESTING DEVICE
Gerald H. Servos, Elmhurst, Ill., assignor to International
Telephone & Telegraph Corporation, New York, N.Y.,
a corporation of Maryland
Filed Sept. 29, 1959, Ser. No. 843,245
5 Claims. (Cl. 324—54)

This invention relates to testing devices and more particularly to devices for electrically testing dielectric material to detect physical defects and structural weakness.

It is old to test dielectric material for physical defects or structural weakness by applying high potential, electrical fields to each side of the material under test. If the material is ruptured or has a serious structural defect, current flows across or though the material thus providing means for causing a suitable alarm to be signaled. While it is easy to maintain uniformity of an electrical field on each side of dielectric material in the form of substantially flat sheets, the problems of maintaining such uniformity are much more difficult when the dielectric material assumes odd shapes.

An object of this invention is to provide new and improved means for testing dielectric materials.

Another object of this invention is to impress high potentials on each side of dielectric material to test for physical defects in such materials.

Yet another object of this invention is to provide means for maintaining uniformity of a high potential field which may be applied to curved surfaces.

In accordance with this invention these and other objects are accomplished by means of a first electrode having contours which are shaped to accommodate one side of dielectric material being tested and second or mating electrodes having contours which are shaped to conform to the other side of dielectric material being tested. The contours of at least one of the electrodes is lined with soft, high carbon content, conductive rubber or other elastic material which has good electrical conducting characteristics. The electrodes are adapted to have a tight fit when in testing position in order that the conductive elastic material may be squeezed to provide uniform physical contact between the two electrodes. The dielectric material which is under test is fitted between the two electrodes so that any structural defect results in an alarm indicating flow of current from one electrode through the material under test to the conductive elastic material lining the other electrode.

Figure 1:
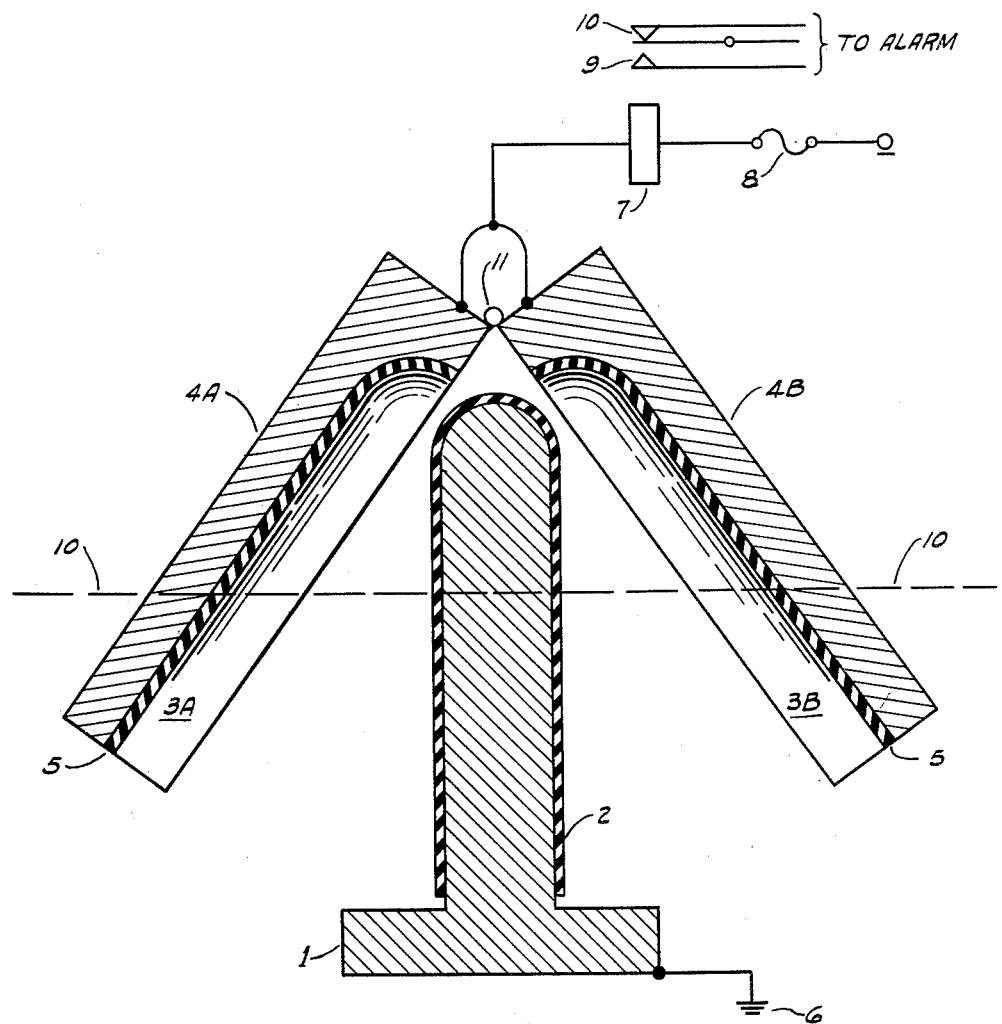

The above mentioned and other objects of this invention together with the manner of obtaining them will become more apparent and the invention itself will be better understood by making reference to the following description of an embodiment of the invention taken in conjunction with the accompanying drawings in which:

FIG. 1 discloses a cross-sectional view of the testing device; and

Figure 2:
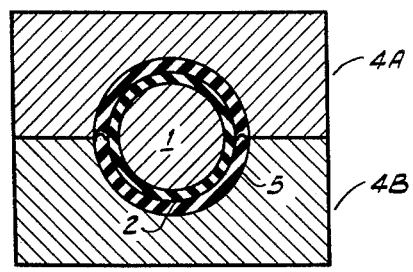

FIG. 2 discloses a second cross-sectional view taken along line 10—10 of FIG. 1 with electrodes 4A and 4B in a closed position.

Where possible, simple terms are used and specific items are described hereinafter to facilitate an understanding of the invention; however, it should be understood that the use of such terms and the description of such items are not to act in any manner as a disclaimer of the full range of equivalents which is normally given under established rules of patent law. For example, electrodes 4A and 4B are shown as a clam shell-like arrangement; whereas, any suitable mounting may be provided. Moreover, the drawing shows a relatively simple and uniform contour for the dielectric material 2 being tested; whereas, many irregular shapes may be accommodated. Furthermore, the alarm means is depicted generally by a simple relay 7; whereas, any suitable equipment may be provided such as electronic devices which are extremely sensitive to relatively small current flow, for example. Quite obviously, other examples could be selected to illustrate the manner in which the terms that have been used and the items which have been described are entitled to a wide range of equivalents.

In accordance with this invention, a high potential electrical field is applied uniformly to each side of a contoured dielectrical material. Referring to FIG. 1, the dielectric material under test is identified generally by the reference numeral 2. A first electrode 1 is provided with a contour which corresponds to the contour of one side of the dielectric material. Second electrodes 4A and 4B have contours designated generally by the reference numerals 3A and 3B which correspond to the other side of dielectric material 2. Since dielectric material 2 is shown as a cylinder having a rounded or somewhat convex terminating contour, areas 3A and 3B of electrodes 4A and 4B are shaped to provide the inside of a cylinder having a mating or complementary concave terminating surface which is lined by any suitable elastic material such as conductive rubber 5.

While any suitable means may be provided for movably mounting electrodes 4A and 4B, the drawing discloses a clam shell-like arrangement having a pivot or hinge point at 11. When the clam shell-like arrangement is in an open position, as shown by the drawing, the dielectric material under test 2 may be fitted over electrode 1. Thereafter, electrodes 4A and 4B may be pivoted at point 11 to close and completely surround the material under test. The size of electrode 1 and the size of the cavities 3A—3B are such that elastic material which may be conductive rubber 5 is squeezed when the clam shell-like arrangement is in a closed position thereby insuring complete physical contact between conductive material 5 and dielectric material 2.

Means is provided for signaling an alarm responsive to the detection of a physical defect in dielectric material 2. That is, an electrical circuit may be traced from ground 6 through electrode 1, dielectric material 2, conductive rubber 5, the winding of relay 7, and fuse 8 to battery. If the dielectric characteristics of material 2 are satisfactory, no current flows, relay 7 remains in an unoperated condition, and contacts 10 remain closed to provide any suitable control function. On the other hand, if there is a serious structural defect in dielectric material 2, current flows from electrode 1 to conductive rubber 5 and through the winding of relay 7 thus causing it to operate. If a serious mechanical defect is present, but dielectric material 2 is not actually ruptured at the start of a test, an electrostatic field builds-up responsive to the high potentials applied between electrodes 1 and 4, thus causing an arc that ruptures material 2 and allows current to flow through the winding of relay 7 which operates. In any event, operation of relay 7 opens contacts 10 and closes contacts 9 to provide any suitable control function such as the transmission of a test failure signal, for example.

Next, reference is made to FIG. 2 which is a cross-sectional view of FIG. 1 taken along line 10—10 with clam shell-like arrangement 4A and 4B in a closed position. Dielectric material 2 is positioned between first electrode 1 and conductive rubber 5 which is squeezed to assure equal physical pressure and, therefore, a uniform electrical field across material 2.

While the principles of this invention have been described in connection with specific apparatus, it is to be clearly understood that this description is made only by way of example and not as a limitation to the scope of the invention.

I claim:

1. In a dielectric testing device, the combination comprising outer electrodes and inner electrodes having complementary contours wherein said outer electrode comprises a clam shell-like arrangement to completely surround the inner electrode when in a closed position and to provide access for inserting a dielectric material for testing when in an open position, the contour of said inner electrode corresponding exactly to the contour of one side of said dielectric material and the complementary contour of said outer electrode corresponding exactly to the contour of the other side of said dielectric material, means comprising elastic sheet material of good electrical conductive characteristics for lining the inside of said outer electrode, the proportions of said electrode being such that said elastic material is squeezed when said outer electrode is closed around said inner electrode, means for impressing a high potential field across said electrodes, and means for positioning said dielectric material between said electrodes whereby current flows from one of said electrodes to the other of said electrodes only through physical defects in said dielectric material.

2. The testing device of claim 1 and means for operating responsive to current flow between said electrodes through said defects in said dielectric material, and means responsive to said last named means for transmitting a test failure signal.

3. The testing device of claim 2 wherein one of said electrodes is shaped to form the outside of a cylinder having a convex end and the other of said electrodes is shaped to form the inside of a cylinder having a concave end.

4. The testing device of claim 1 wherein said clam shell-like arrangement is shaped to provide a cylindrical-concave cavity when in said closed position.

5. Apparatus for testing dielectric materials having a pre-determined contour comprising means for applying a high potential electrical field to each side of said contoured dielectrical materials, said means comprising a first electrode having a generally convex surface and a second electrode having a mating concave surface, said convex surface corresponding exactly to the inside of said pre-determined contour and said concave surface corresponding exactly to the outside of said pre-determined contour, means comprising an elastic electrical conductor for lining at least one of said electrodes, and means for giving an alarm failure signal responsive to current flow through physical defects in said dielectric material.

References Cited in the file of this patent

UNITED STATES PATENTS

| | | |
|---|---|---|
| 2,221,323 | Gammeter | Nov. 12, 1940 |
| 2,445,808 | Stenstrom | July 27, 1948 |
| 2,622,129 | Killian | Dec. 16, 1952 |
| 2,649,960 | Gammeter | Aug. 25, 1953 |
| 2,663,844 | Earle et al. | Dec. 22, 1953 |
| 2,696,589 | Bendix et al. | Dec. 7, 1954 |